United States Patent
Suzuki

(10) Patent No.: US 12,358,658 B2
(45) Date of Patent: Jul. 15, 2025

(54) ROTARY WING AIRCRAFT

(71) Applicant: AERONEXT INC., Shibuya-ku (JP)

(72) Inventor: Yoichi Suzuki, Shibuya-ku (JP)

(73) Assignee: AERONEXT INC., Tokyo (JP)

( * ) Notice: Subject to any disclaimer, the term of this patent is extended or adjusted under 35 U.S.C. 154(b) by 5 days.

(21) Appl. No.: 18/000,057

(22) PCT Filed: May 27, 2020

(86) PCT No.: PCT/JP2020/020884
§ 371 (c)(1),
(2) Date: Nov. 28, 2022

(87) PCT Pub. No.: WO2021/240681
PCT Pub. Date: Dec. 2, 2021

(65) Prior Publication Data
US 2023/0202686 A1    Jun. 29, 2023

(51) Int. Cl.
| | |
|---|---|
| *B64U 10/16* | (2023.01) |
| *B64U 50/13* | (2023.01) |
| *B64C 17/02* | (2006.01) |
| *B64U 10/10* | (2023.01) |
| *B64U 30/297* | (2023.01) |
| *B64U 40/20* | (2023.01) |
| *B64U 50/19* | (2023.01) |
| *B64U 50/30* | (2023.01) |

(52) U.S. Cl.
CPC ............ *B64U 10/16* (2023.01); *B64U 50/13* (2023.01); *B64C 17/02* (2013.01); *B64U 10/10* (2023.01); *B64U 30/297* (2023.01); *B64U 40/20* (2023.01); *B64U 50/19* (2023.01); *B64U 50/30* (2023.01); *B64U 2201/20* (2023.01)

(58) Field of Classification Search
CPC ......... B64C 17/02; B64C 27/26; B64U 10/16; B64U 20/80; B64U 30/40; B64U 20/08; B64U 40/20
See application file for complete search history.

(56) References Cited

U.S. PATENT DOCUMENTS 9,120,560 B1 *   9/2015   Armer ............... B64C 27/26
9,550,561 B1 *   1/2017   Beckman ........... B64U 40/20
(Continued)

FOREIGN PATENT DOCUMENTS

CN    207607650 U    7/2018
CN    109094779 A    12/2018
(Continued)

OTHER PUBLICATIONS

International Search Report dated Jul. 14, 2020 for International Application No. PCT/JP2020/020884.
(Continued)

*Primary Examiner* — Christopher D Hutchens
(74) *Attorney, Agent, or Firm* — HAUPTMAN HAM, LLP

(57) ABSTRACT

The operational efficiency of a rotorcraft in cruising. The rotary wing aircraft, according to the present disclosure, has a main body and a plurality of motors provided in the main body for rotating each of the rotors, which are parallel to a reference plane. When the main body is inclined with respect to one direction of travel and flying in the direction of travel, the rotational speed of each of the plurality of motors is approximately the same.

15 Claims, 13 Drawing Sheets

(56) References Cited

U.S. PATENT DOCUMENTS

| | | | | |
|---|---|---|---|---|
| 9,908,619 | B1* | 3/2018 | Beckman | B64U 40/20 |
| 10,011,353 | B1* | 7/2018 | Beckman | B64C 39/024 |
| 10,392,104 | B1* | 8/2019 | Urban | B64C 39/024 |
| 10,543,905 | B1* | 1/2020 | Kwon | B64C 17/02 |
| 10,894,599 | B1* | 1/2021 | Popiks | B64C 27/30 |
| 11,275,389 | B2* | 3/2022 | Qu | B64C 27/02 |
| 11,524,768 | B2* | 12/2022 | Suzuki | B64U 10/14 |
| 2011/0226892 | A1* | 9/2011 | Crowther | B64C 15/02 |
| | | | | 244/17.23 |
| 2013/0251525 | A1* | 9/2013 | Saiz | B64C 29/0083 |
| | | | | 416/23 |
| 2016/0031554 | A1* | 2/2016 | Eshkenazy | B64U 10/14 |
| | | | | 244/6 |
| 2016/0032895 | A1* | 2/2016 | Weddendorf | F03D 5/00 |
| | | | | 244/17.23 |
| 2016/0122018 | A1* | 5/2016 | Matsue | H04N 7/185 |
| | | | | 244/17.13 |
| 2016/0159471 | A1* | 6/2016 | Chan | B64D 47/08 |
| | | | | 244/39 |
| 2016/0264234 | A1* | 9/2016 | Vaughn | A63H 27/12 |
| 2016/0340028 | A1* | 11/2016 | Datta | B64C 27/08 |
| 2016/0376014 | A1* | 12/2016 | Alnafisah | B64U 10/16 |
| | | | | 244/39 |
| 2017/0205826 | A1* | 7/2017 | Smith | G05D 1/0094 |
| 2017/0300065 | A1* | 10/2017 | Douglas | B64C 29/0025 |
| 2018/0229833 | A1* | 8/2018 | Kimchi | B64C 25/10 |
| 2019/0329882 | A1* | 10/2019 | Baity | B64U 30/14 |
| 2020/0354050 | A1* | 11/2020 | Zimenskaya | B64U 10/20 |
| 2021/0163122 | A1* | 6/2021 | Kawakami | B64D 45/00 |
| 2021/0269143 | A1* | 9/2021 | Nishio | B64D 45/00 |
| 2022/0404841 | A1* | 12/2022 | Ishizuka | G05D 1/101 |

FOREIGN PATENT DOCUMENTS

| | | |
|---|---|---|
| JP | 2016-088121 A | 5/2016 |
| JP | 6086519 B1 | 3/2017 |
| JP | 2017532256 A | 11/2017 |
| JP | 2019142441 A | 8/2019 |
| JP | 2019171997 A | 10/2019 |
| WO | 2016185572 A1 | 11/2016 |

OTHER PUBLICATIONS

Office Action in CN application No. 202110423968.5, dated Dec. 25, 2024, 14pp.

Office Action in JP application No. 2024-059516, mailed Dec. 12, 2024, 6pp.

Office Action in JP application No. 2024-059516, mailed Apr. 3, 2025, 6pp.

* cited by examiner

ROTARY WING AIRCRAFT

TECHNICAL FIELD

The present invention relates to a rotary wing aircraft.

BACKGROUND ART

In recent years, flying vehicles such as drones and unmanned aerial vehicles (UAVs) (hereinafter collectively referred to as "flying vehicles") have been used for a variety of purposes. The use of flying vehicles, such as drones and unmanned aerial vehicles (UAVs), is expanding. Among these, rotary wing aircraft, which use rotors to generate lift, are attracting attention. In the utilization of rotary wing aircraft and other flying vehicles in various industries, there is a need for aircraft with high operational efficiency.

For example, Patent Literature 1 discloses a UAV in which the center of lift, the center of connection, and the center of gravity of the unmanned aerial vehicle are at predetermined positions.

PRIOR ART LIST

Patent Literature

[Patent Literature 1] WO 2016/185572 A1

SUMMARY OF THE INVENTION

Technical Problem

In further applications of rotary wing aircraft, there is a need for longer cruise times and lower operating costs for rotorcraft. In other words, there is a need to further improve the operational efficiency of such rotary wing aircraft.

Therefore, the present disclosure was made in view of the above problems, and its purpose is to provide a rotary wing aircraft that can improve the efficiency of operation in cruising of the rotary wing aircraft.

Technical Solution

According to the present disclosure, there is provided a rotary wing aircraft with a main body and a plurality of motors provided on the main body for rotating each of the rotors, wherein when the main body is flying in the direction of travel at an angle to one direction of travel that is parallel to a reference plane, the rotation speed of each of the plurality of motors is approximately the same.

Advantageous Effects

The present invention improves the operational efficiency of rotary wing aircraft in cruise.

DETAILED DESCRIPTION OF THE EMBODIMENTS

The following is a detailed description of a suitable embodiment of the present disclosure with reference to the accompanying drawings. In this specification and the drawings, components having substantially identical functional configurations will be omitted from duplicated explanations by applying the same symbols.

First, the first embodiment of the present disclosure will be described with reference to the drawings. For ease of explanation, a small unmanned rotary wing aircraft is used here, but such an unmanned rotary wing aircraft is only an example and does not limit the form of the flying vehicle. For example, the rotary wing aircraft can be manned or unmanned.

Figure 1:
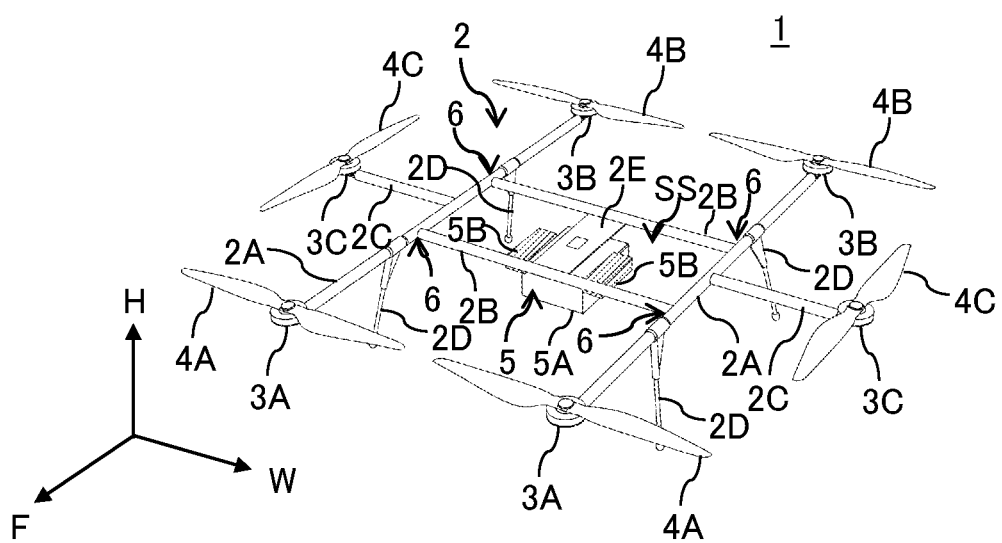
FIG. 1 is a perspective view showing an example of the configuration of a rotary wing aircraft 1 in accordance with the first embodiment of the present disclosure.
Figure 2:
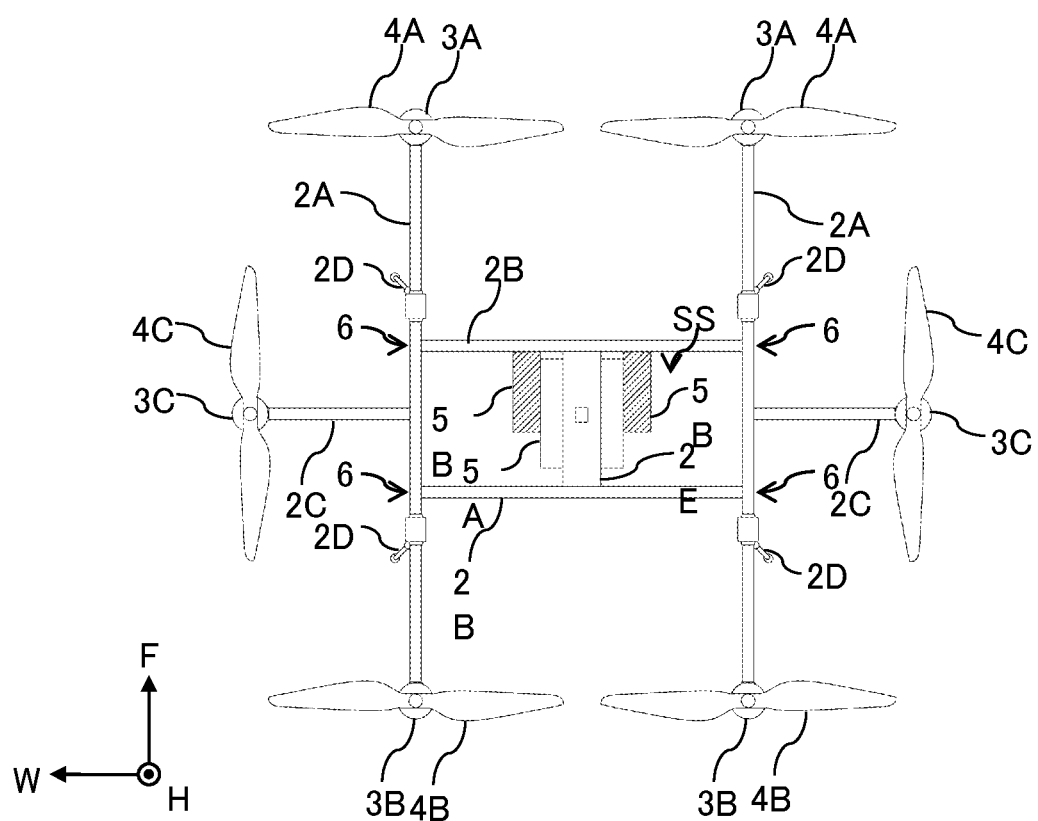
FIG. 2 is a plan view showing an example of the configuration of the rotary wing aircraft 1 of the same embodiment.
Figure 3:
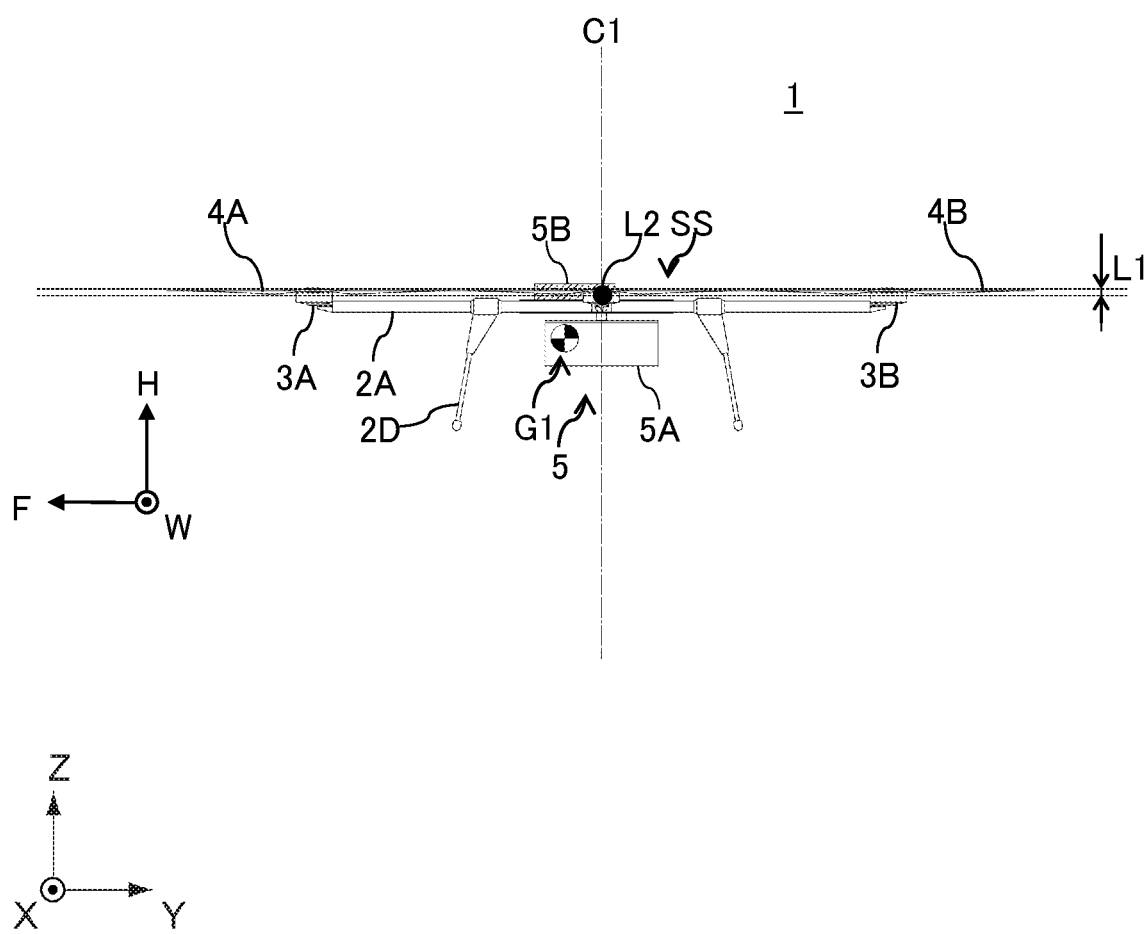
FIG. 3 is a side view showing an example of the configuration of the rotary wing aircraft 1.

FIG. 1 is a perspective view of an example configuration of a rotary wing aircraft 1 of the first embodiment of the present disclosure. FIG. 2 is a plan view showing an example of the configuration of the rotary wing aircraft 1. FIG. 3 is a side view showing an example of the configuration of the rotary wing aircraft 1. In this specification, direction F is the front-back direction of the rotary wing aircraft 1 (+direction is forward, −direction is backward), direction W is the width direction of the rotary wing aircraft 1, direction H is the height direction of the rotary wing aircraft 1. The +direction of direction F means the direction in which the rotary wing aircraft 1 travels when cruising. Cruising means that the rotary wing aircraft 1 is flying along the component direction in the air, including at least the horizontal direction. The direction of travel means the direction in the horizontal component. The reference plane means a horizontally extending surface, such as the ground or a water surface, for example. In other words, the direction of travel is the direction that is roughly parallel to this reference plane.

As shown in FIGS. 1 to 3, the rotary wing aircraft 1 in the present embodiment comprises a main body 2, a motor 3 (3A, 3B, 3C), a rotor 4 (4A, 4B, 4C), and mounting part 5.

The main body 2 in this embodiment comprises a plurality of frames 2A, 2B, and 2C, leg part 2D, and a base 2E for mounting a flight controller (not shown) for controlling the flight of the rotary wing aircraft 1. Frames 2A and 2A are provided extending in the forward and backward directions (direction of travel) F of the rotary wing aircraft 1. The frames 2A, 2A are provided in parallel. Motors 3A, 3A and motors 3B, 3B are provided at the front and rear ends of frames 2A and 2A, respectively. Frames 2B and 2B are provided near the center of frames 2A and 2A, with frames 2A, 2A are provided along the width direction W so as to bridge the frames 2A, 2A. Frames 2A and 2A are connected to frames 2B and 2B at a plurality of connection points 6. The space enclosed by the frames 2A, 2A, 2B, 2B and the plurality of connection points 6 is an enclosed space SS. The enclosed space SS is formed by the frames. The enclosed space SS may be provided with, for example, at least a part of the mounting part.

Frames 2C, 2C are connected to frames 2A, 2A and extended outwardly along the width direction. At the opposite ends of frames 2C and 2C from frames 2A and 2A, motors 3C, 3C are provided, respectively. Leg parts 2D, 2D are provided connected to frames 2A, 2A. Such leg parts 2D may be either frames 2B, 2B or frames 2C, 2C. The leg parts 2D may not be provided. The base 2E is provided, for example, to bridge the frames 2B, 2B. Such base 2E may be provided, for example, to support the mounting part 5. The mounting part 5 may be supported in a portion of the main body 2 other than the base 2E. For example, part or all of the mounting part 5 may be provided as an integral part of the frame 2A.

Motor 3 provides the driving force to rotate rotor 4. Motor 3 obtains energy from battery 5B under the control of a flight controller (not shown). The number and location of the motors 3 provided are not limited. In this embodiment, the forward motors 3A, 3A, rear motors 3B, 3B and side motors 3C, 3C are provided. The structure and type of motor 3 are not limited. The motors 3 can be connected to the main body 2 by a motor mount (not shown).

The rotor 4 is a mechanism installed on the motor 3 to provide lift and thrust for the rotary wing aircraft 1. The rotor 4 is, for example, a propeller-shaped rotor blade. The number and position of the rotors 4 provided are not particularly limited and can be determined, for example, according to the number and position of the motors 3 to be provided. The number of blades provided on each of the rotors 4 is not particularly limited. For example, the rotor 4 may be a double-reversing propeller or the like. In this embodiment, the front rotors 4A, 4A, rear rotors 4B, 4B and lateral rotors 4C, 4C are provided.

The mounting part 5 is a part to be mounted on the main body 2. The mounting part 5 can include, for example, an enclosure 5A and a battery 5B. The enclosure 5A is described in this embodiment as an example of a case for delivering packages and the like, but the present technology is not limited to such examples. For example, the mounting part 5 may include a camera, a sensor and an actuator for inspecting structures, etc., and other objects that can be mounted on the main body 2. There may be a single or multiple objects comprising the mounting part 5. Battery 5B is an example of an energy source and can supply power to motor 3 and other devices. The type of batten 5B is not limited. The energy source may be in a form other than a battery. These mounting parts 5 may be provided in displaceable connection with the main body 2, or may be fixed to the main body 2.

Referring now to FIG. 3, viewed from the side (i.e., z width direction W) relative to the direction of travel (front-back direction) F, the center of gravity G1 of the rotary wing aircraft 1 of this embodiment is below the lift-generating area L1 of the main body 2, and is forward of the center position C1 of the main body 2. Here, the center of gravity G1 of the rotary wing aircraft 1 in this embodiment means the center of gravity G1 of the main body 2 and the mounting part 5 (including the battery 5B). In the rotary wing aircraft of this embodiment, the lift-generating region L1 is the area included in the width of the blades of each rotor 4 (along the height direction H in FIG. 3). In this lift-generating region L1, there can be a lift-generating center point (lift center) L2 based on the position of each of the rotors 4 in plan view. The lift center L2 is located at the geometric center position in plan view of each of the rotors 4, when the output of each of the rotors 4 is approximately the same.

If, for example, each of the rotors 4 is provided in a mixed form of push and pull type or on different levels, the lift generating area L1 can be defined as follows. First, obtain the positions of the upper and lower ends of the rotor 4 blades in the width direction (height direction H in the rotary wing aircraft 1) at the respective rotary shafts of the motor 3. The space sandwiched between the least-squares planes obtained by the point groups corresponding to each of the upper end positions at each of the rotary axes and the point groups corresponding to each of the lower end positions at each of the rotary axes can be defined as the lift generating region L1. The position of the center of lift L2 in this case is the same as in the case described above.

The center position C1 of the main body 2 means the center position between the front end and the rear end in the front-back direction F of the main body 2.

Figure 4:
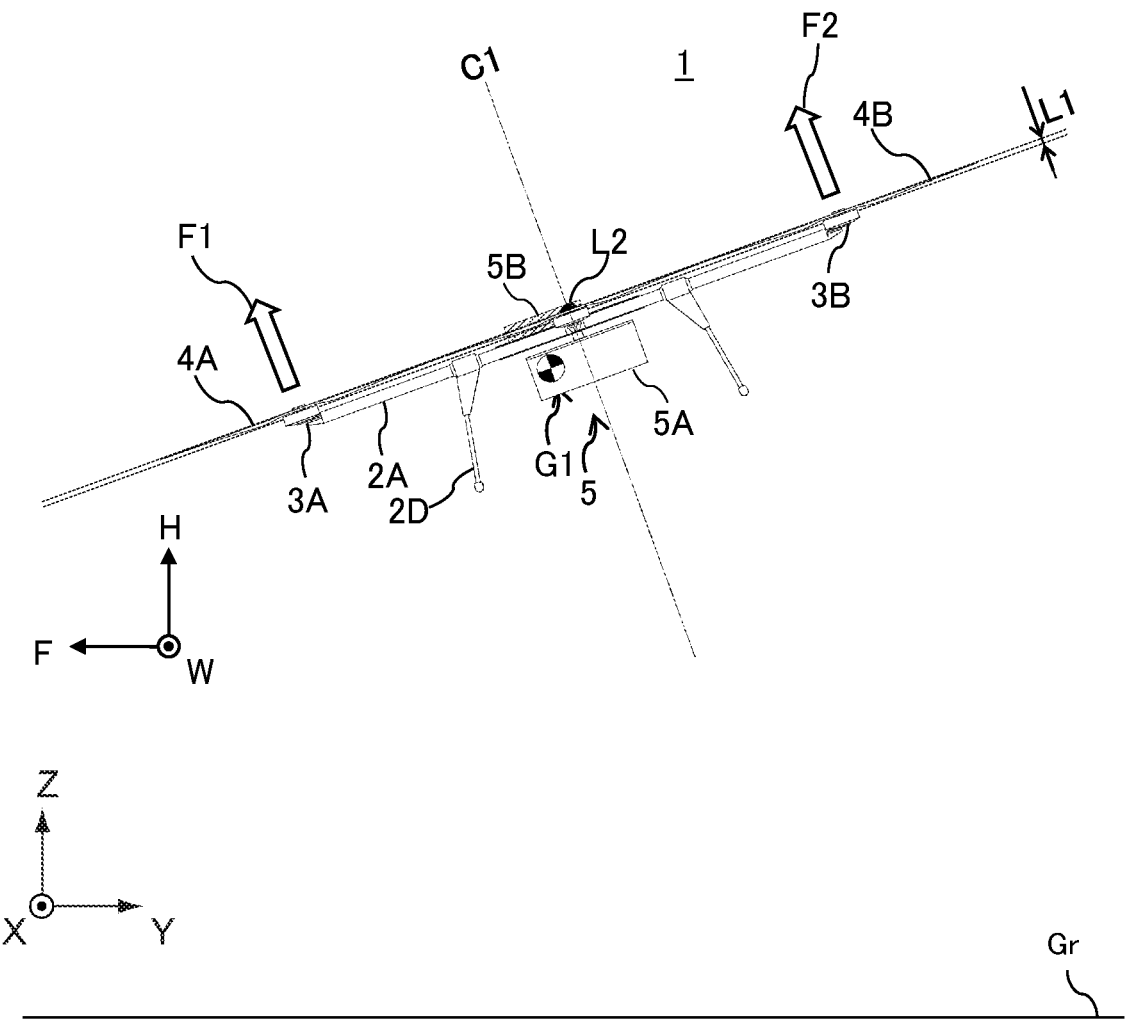
FIG. 4 is showing an example of the flight pattern of the rotary wing aircraft 1 in cruise.

FIG. 4 shows an example of the flight configuration of the rotary wing aircraft 1 in cruise. The rotary wing aircraft 1 shown in FIG. 4 is inclined with respect to the direction of travel F and is flying in the direction of travel F. The direction of travel F of the rotary wing aircraft 1 is the front-back direction F of the main body 2. At this time, the center of gravity G1 of the rotary wing aircraft 1 is below the lift-generating area L1 and is on the side (forward side) of the direction of travel from the center position C1.

When cruising in such an attitude, the positional relationship between the center of lift L2, which is the center that generates lift in the direction of height H, and the center of gravity G1, the variation in the load on the motor 3 due to the pitch moment that can be generated for the rotary wing aircraft 1 is reduced. Therefore, the lift force F1 generated by the front rotor 4A and the lift force F2 generated by the rear rotor 4B can be matched when the rotary wing aircraft 1 is inclined with respect to the direction of travel F. Then, the rotational speeds of motors 3A and 3B are roughly the same.

In conventional rotorcraft that do not consider the position of such center of gravity G1, the rear of the rotorcraft needs to be lifted and the front of the rotorcraft needs to be lowered because the rotorcraft needs to be tilted for cruising. In this case, the lift of the rear rotor must be greater than that of the front rotor. In this way, the speed of the motor in the rear will be larger and the speed of the rotor in the front will be smaller. Thus, variations in motor speed can occur.

In the rotary wing aircraft 1 of this embodiment, when the rotary wing aircraft 1 is inclined in the direction of travel F during cruise, the rotational speeds of the forward motor 3A and the rear motor 3B can be made to be almost equal. This can suppress variations in battery consumption (i.e., energy consumption) due to differences in motor speeds during cruise. This can, for example, further extend the cruising time. The load on the motor can also be homogenized, and the motor can be operated more efficiently. Thus, it is possible to improve the efficiency of the operation of rotary wing aircraft in cruise.

The position where the enclosure 5A and the battery 5B of the mounting part 5 are installed with respect to the main body 2 is not particularly limited. As long as the location of the center of gravity G1 described above can be set, the installation position, size, weight, and configuration of the mounting part 5 are not particularly limited.

Figure 5:
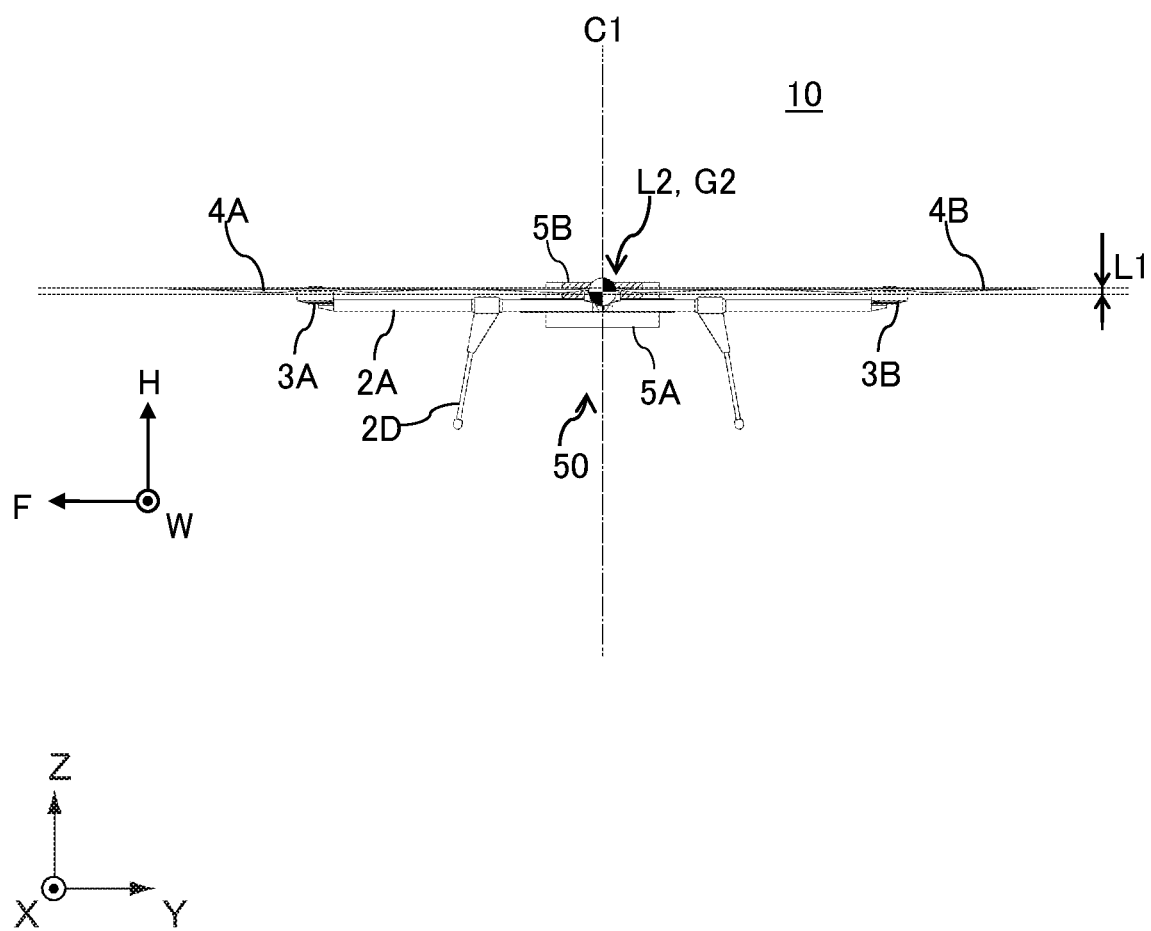
FIG. 5 is a side view showing an example of the configuration of a rotary wing aircraft 10 for the first variant of the embodiment.

Next, a modification of this embodiment will be described. FIG. 5 is a side view of an example of the configuration of the rotary wing aircraft 10 for the first modification of the present embodiment. In this modification, the position of the center of gravity G2 of the rotary wing aircraft 10, viewed from the side with respect to the direction of travel F (front-back direction), is included in the lift-generating area L1 and is located in the center position C1 of the main body 2. The position of the center of gravity G2 can be almost coincident with the center of lift L2. The position of such center of gravity G2 can be changed, for example, by adjusting the configuration of the main body 2, the contents of the mounting part 50, or the installation position. Other configurations of the rotary wing aircraft 10 are the same as in the above embodiment. The term "located at the central position C1 of the main body 2" means that it is almost coincident with the central position C1. The "almost coincident" means that the center of gravity G2 is located within 3 cm from the central position C1 in the front-back direction F.

Figure 6:
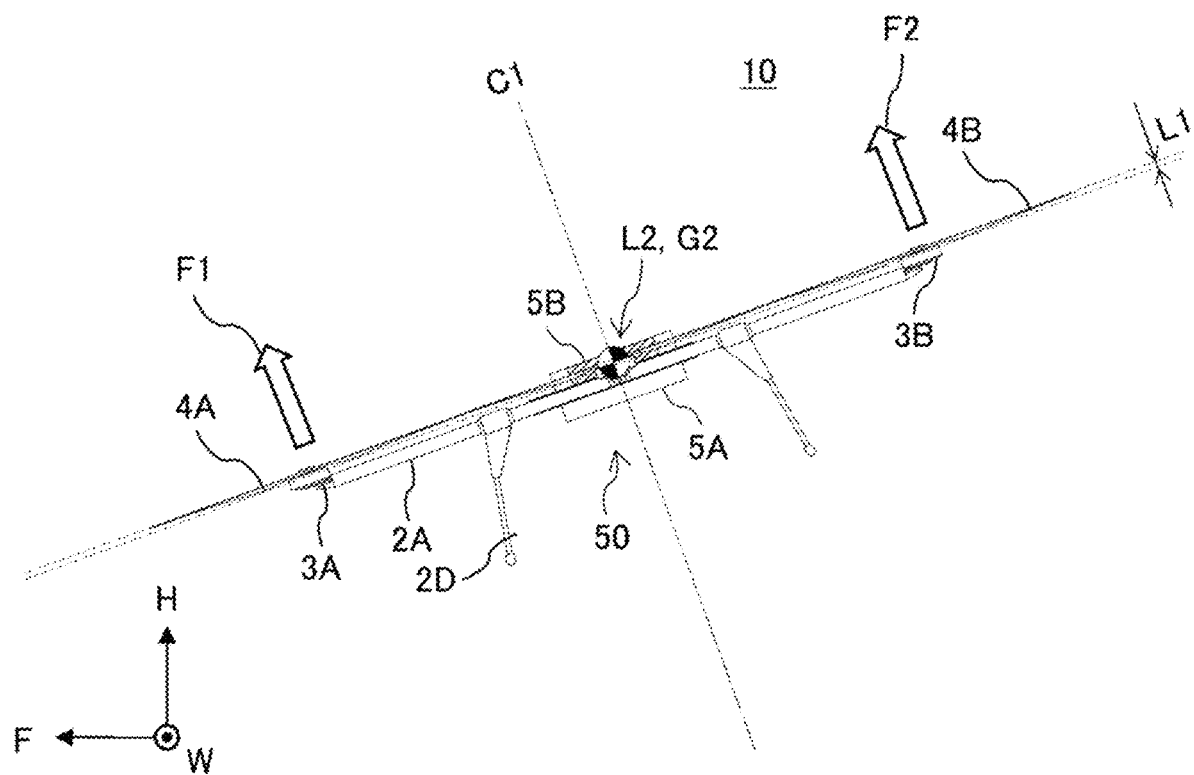
FIG. 6 shows an example of the flight pattern of the rotary wing aircraft 10 during cruise.

FIG. 6 shows an example of the flight pattern of the rotary wing aircraft 10 in cruise flight for this modification. When the rotary wing aircraft 10 is flying with a constant inclination to the direction of travel F, the moment around the center of gravity G2 is difficult to generate, so the forward rotor 4A and the rear rotor 4A generate the same lift force F1 and F2. Therefore, the rotational speeds of the forward motor 3A and the rear motor 3B can be made almost equal. This reduces the variation in battery consumption due to the difference in motor speeds during cruising.

Figure 7:
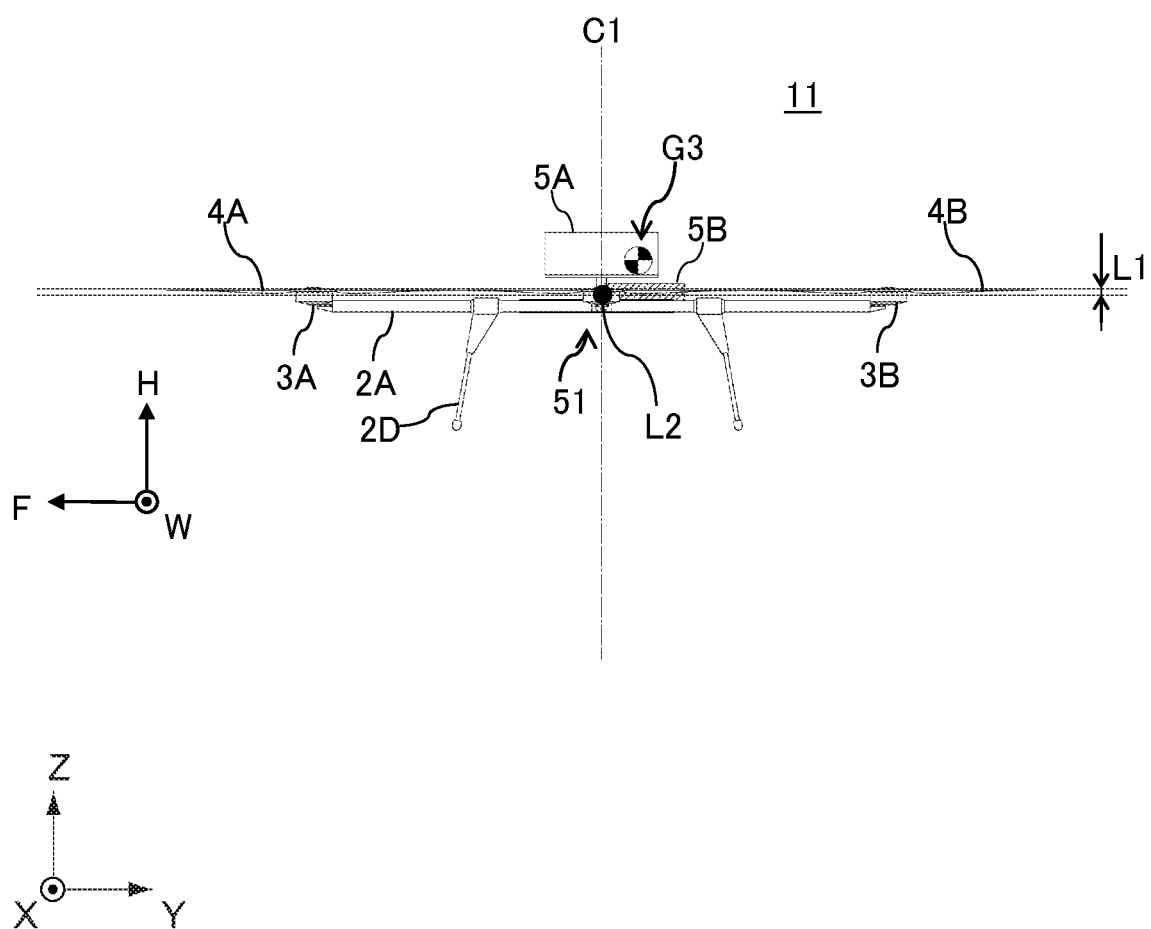
FIG. 7 is a side view showing an example of the configuration of a rotary wing aircraft 11 for the second variant of the same embodiment.

FIG. 7 is a side view of an example of the configuration of the rotary wing aircraft 11 for the second variant of this embodiment. In this modification, the center of gravity G3 of the rotary wing aircraft 11, viewed from the side in the direction of travel F (front-back direction), is above the lift generation area L1, and on the opposite side of the direction of travel F from the center position C1 of the main body 2 (i.e., the rear side). Other configurations of the rotary wing aircraft 11 are the same as in the above embodiment. Although the mounting part 51 is located at the top of the main body 2, the location of the mounting part 51 is not particularly limited.

Figure 8:
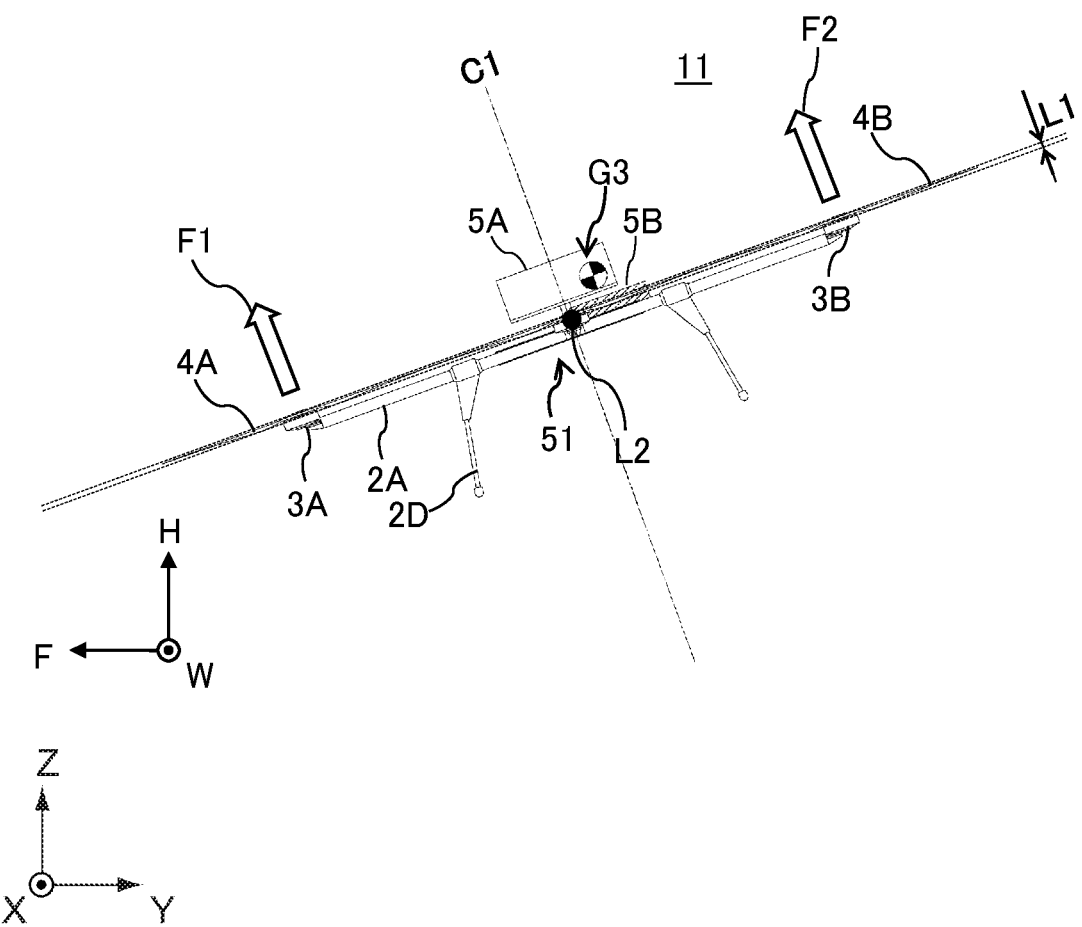
FIG. 8 is a diagram showing an example of the flight pattern of the rotary wing aircraft 11 for the same variant during cruise.

FIG. 8 shows an example of the flight pattern of the rotary wing aircraft 11 in cruise flight for this modification. When the rotary wing aircraft 11 is flying at a constant inclination with respect to the direction of travel F, due to the positional relationship between the center of lift, which is the center that generates lift in the height direction H, L2 and the center of gravity G3, the variation in the load on the motor 3 due to the pitch moment that can be generated for the rotary wing aircraft 1 is reduced. Therefore, the lift force F1 generated by the front rotor 4A and the lift force F2 generated by the rear rotor 4B can be matched when the rotary wing aircraft 1 is inclined with respect to the direction of travel F. Then, the rotational speeds of motors 3A and 3B are roughly the same.

By positioning the center of gravity of the rotary wing aircraft 1 as described above, the rotational speed of each of the motors 3 can be averaged in the cruise of the rotary wing aircraft 1. This can reduce the variation in the power output by the motors 3 and the associated effects. Thus, the rotary wing aircraft 1 can be operated more efficiently in long-distance flights, etc.

Figure 9:
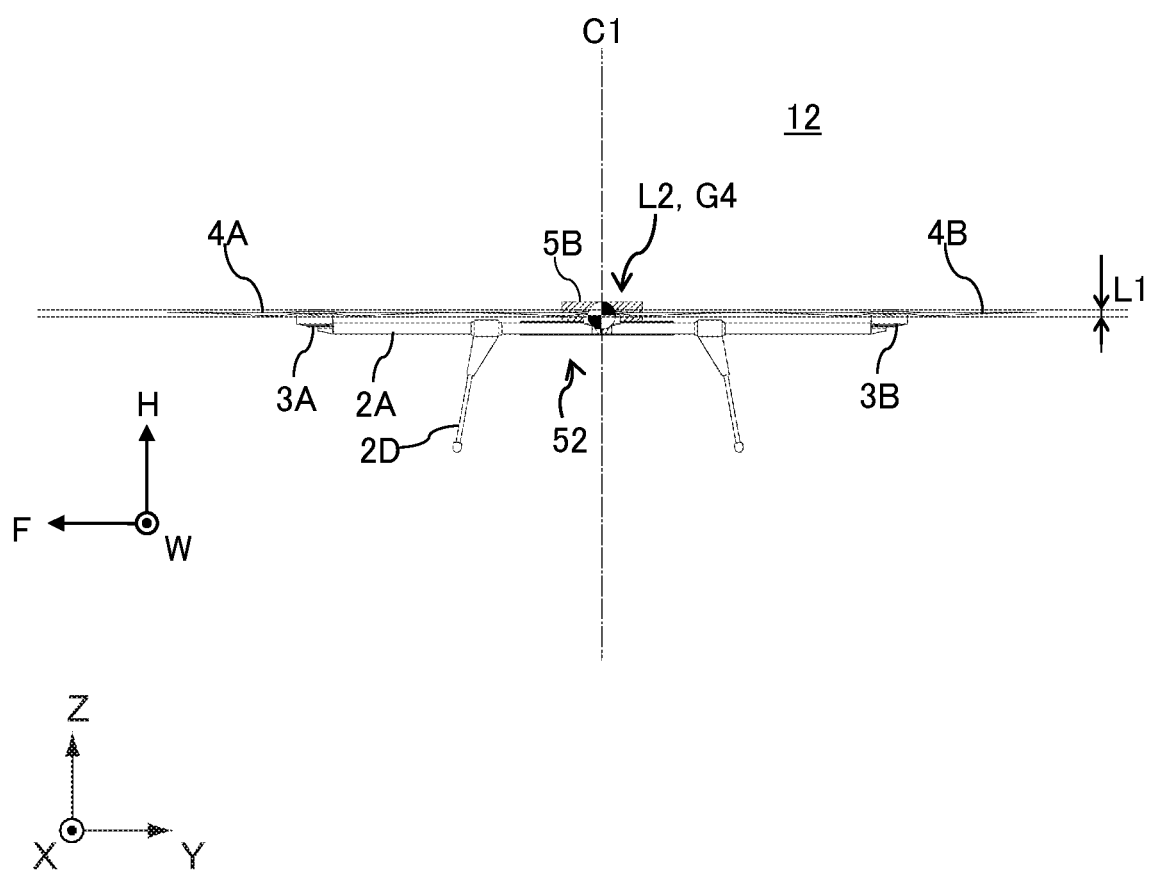
FIG. 9 is a side view showing an example of the configuration of a rotary wing aircraft 12 according to the second embodiment of the present disclosure.

Next, the second embodiment of the present disclosure will be described. FIG. 9 is a side view of an example configuration of the rotary wing aircraft 12 of the second embodiment of the present disclosure.

Unlike the rotary wing aircraft 1 of the first embodiment, the rotary wing aircraft 12 of this embodiment differs from the rotary wing aircraft 1 of the first embodiment in that the battery 5B is mounted on the main body 2 as the mounting part 52. The other parts are the same as the rotary wing aircraft 1 of the first embodiment. The center of gravity G4 of the rotary wing aircraft 12 is the center of gravity of the main body 2 and the battery 5B.

As shown in FIG. 9, the position of the center of gravity G4 is included in the lift force generation area L1 and is located in the center of the main body 2. C1. The position of the center of gravity G4 can be approximately coincident with the center of lift L2. In this case, as in the first modification of the first embodiment, when the rotary wing aircraft 12 is flying with a constant inclination with respect to the direction of travel F, the lift forces generated by the forward rotor 4A and the rear rotor 4A F1 and F2 are almost the same as it is difficult to generate a moment around the center of gravity G4. Therefore, the rotational speed of the forward motor 3A and the rear motor 3B can be made almost equal.

Such rotary wing aircraft 12 may be equipped with a enclosure for mounting baggage or the like, or a camera, sensor, actuator, or the like as appropriate. In this case, these loadings may be provided in connection with the main body 2. The loading may be displaceably connected to the main body 2 or may be fixed to the main body 2. For example, when the loading is displaceably connected to the main body 2, the position of the center of gravity of the loading can be controlled. Therefore, the position of the center of gravity G4 of the main body 2 and battery 5B (i.e., the center of gravity of the rotary wing aircraft 12) can be controlled separately from the position of the center of gravity of the mounted object. Therefore, averaging of the respective rotational speeds of the motors 3 can be achieved regardless of the type, shape, etc. of the loadings.

Figure 10:
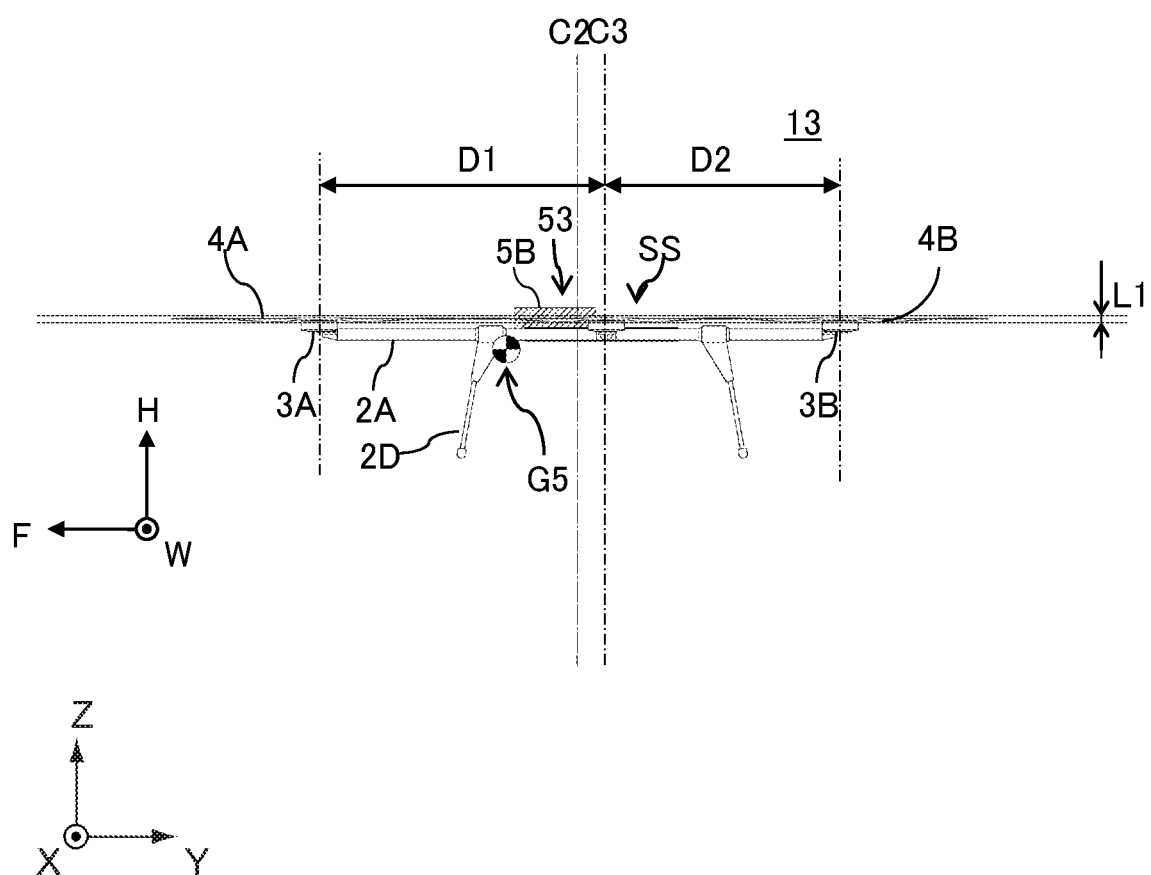
FIG. 10 is a side view showing an example of the configuration of a rotary wing aircraft 13 for the third embodiment of the present disclosure.

Next, the third embodiment of the present disclosure will be described. FIG. 10 is a side view of an example of the configuration of the rotary wing aircraft 13 of the third embodiment of the present disclosure. Unlike the rotary wing aircraft 13 of the first embodiment, the rotary wing aircraft 13 of this embodiment differs from the rotary wing aircraft 1 of the first embodiment in that the length of the rear arm of the frame 2A is shorter than the length of the front arm.

To explain in detail, first, the center of gravity of the rotary wing aircraft 13 (i.e., the center of gravity of the main body 2 and the battery 5B, which is an example of the mounting part 5) G5 is located on the traveling direction side of the central position C2 of the main body 2 with respect to the direction of travel F when viewed from the side. The center of gravity G5 is also lower than the lift force generation area L1, or when the center position of the portion of frame 2A forming the enclosure space SS (the portion between connection points 6 and 6) viewed from the side in the direction of travel F is defined as reference position C3, then the distance D1 is longer than the distance D2 between the rear motor 3A and the reference position C3.

In this asymmetric configuration of the main body 2, similarly, in the inclined attitude of the rotary wing aircraft 13 in cruise, the rotational speeds of the forward motor 3A and the rear motor 3B can be averaged.

Figure 11:
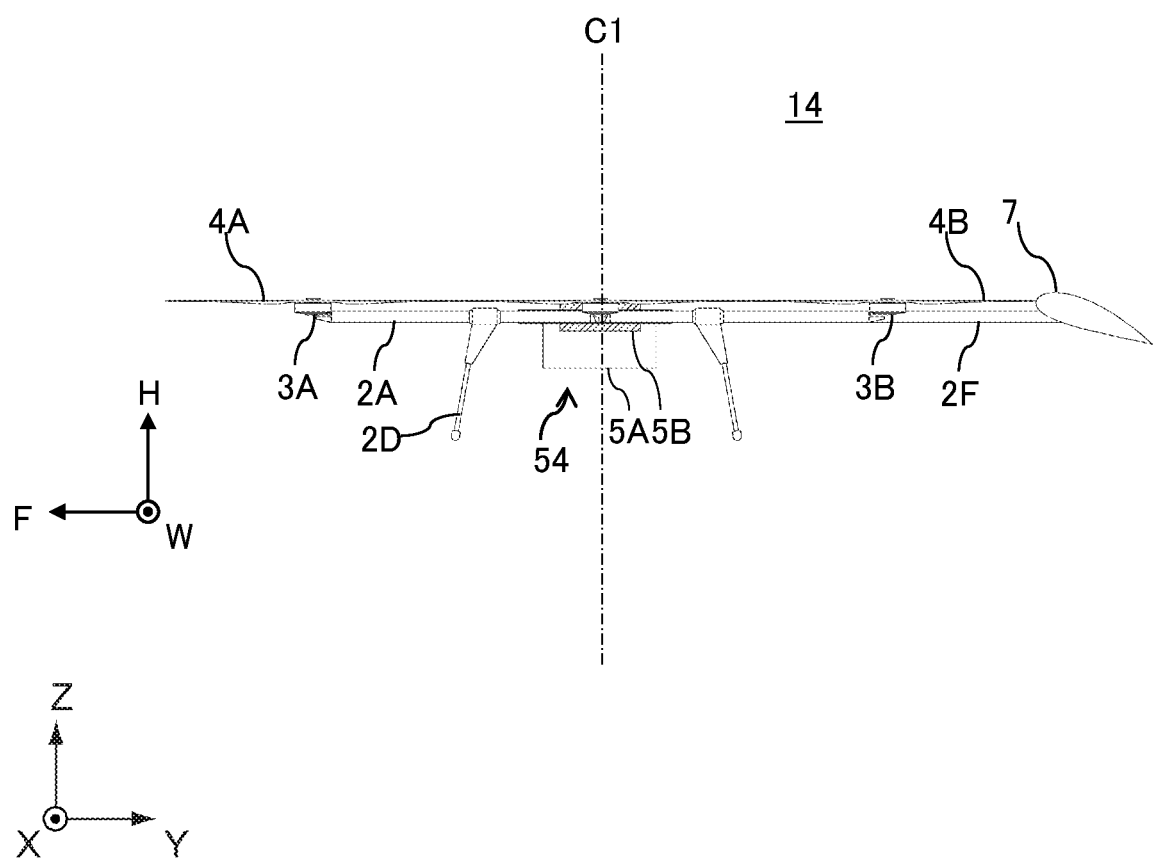
FIG. 11 is a side view showing an example of the configuration of a rotary wing aircraft 14 for a fourth embodiment of the present disclosure.

Next, the fourth embodiment of the present disclosure will be described. FIG. 11 is a side view of an example of the configuration of the rotary wing aircraft 14 of the fourth embodiment of the present disclosure. The rotary wing aircraft 14 of this embodiment has a frame 2F from the main body 2 of the rotary wing aircraft 1 of the first embodiment to the rear, and a wing 7, which is an example of an aerodynamic part, is provided on the frame 2F. The frame 2F is connected, for example, to the rear frame 2B and can extend backward along the direction of travel F. Wing 7 can be a fixed wing or a dynamic wing.

Wing 7 is provided so that when the rotary wing aircraft 14 is inclined with respect to the direction of travel F during cruise, lift can be generated by the airflow from the front. By generating lift to the rotary wing aircraft 14 by the wing 7, lift can be added to the rear of the rotary wing aircraft 14. In this way, the load from the rear motor 3B can be reduced. This allows the speeds of the forward motor 3A and the rear motor 3B to be averaged. If the wing 7 is a dynamic wing, the magnitude of the lift force can be adjusted. In this way, the number of rotations of the forward motor 3A and the rear motor 3B can be averaged even in the state of inclination at any pitch angle.

Although the position where the wing 7 is provided is not particularly limited, it is preferable that the wing 7 is provided on the rear side along the direction of travel F from the center position C1 of the main body 2 (the center between the front and rear ends of frame 2A) when viewed from the side in the direction of travel F. By obtaining lift at the rear side, it is easier to obtain the effect of averaging the number of revolutions. Furthermore, it is preferred that the wing 7 is provided on the rear side along the direction of travel F compared with any of the motors 3. This allows the effect of the pitch moment on the rotary wing aircraft 14 to be more suppressed.

Figure 12:
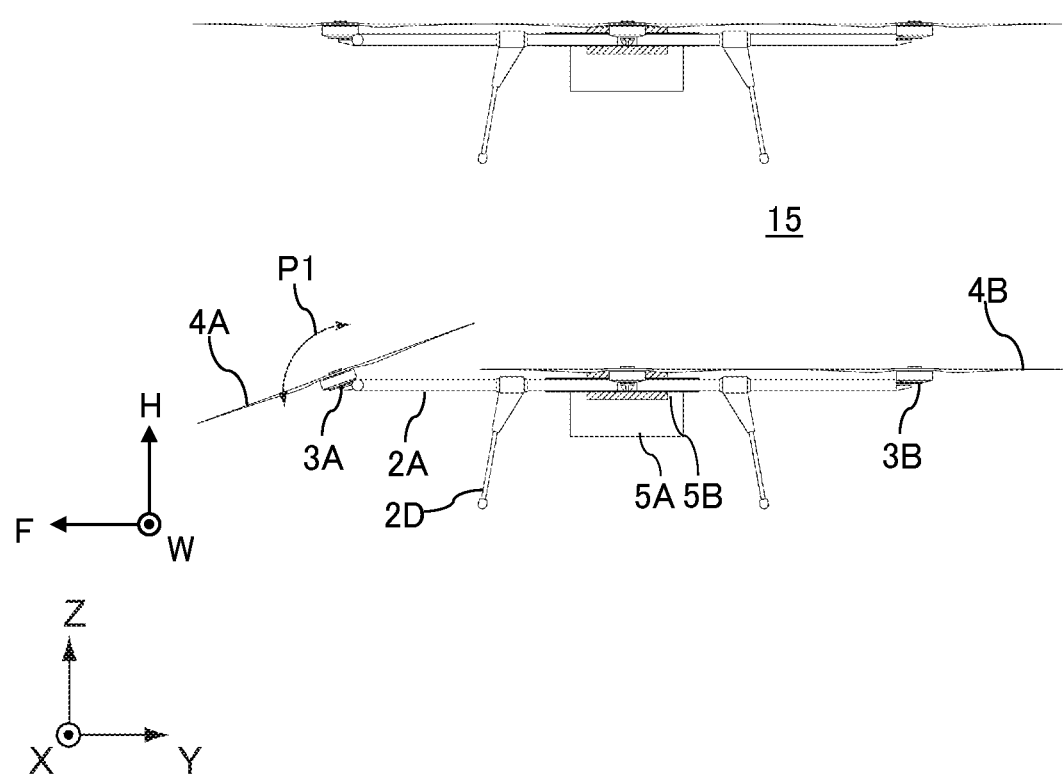
FIG. 12 is a side view showing an example of the configuration of a rotary wing aircraft 15 for a fifth embodiment of the present disclosure.

Next, the fifth embodiment of the present disclosure will be described. FIG. 12 is a side view of an example configuration of the rotary wing aircraft 15 of the fifth embodiment of the present disclosure. In the rotary wing aircraft 15 of this embodiment, the forward motor 3A is provided to be rotatable around the pitch axis P1. The range of the rotatable range of P1 around the pitch axis is not limited.

According to such a configuration, the forward motor 3A can be tilted forward around the pitch axis during cruising of the rotorcraft 15. In this way, the component of the lift force vector generated by the forward rotor 4A and the rear rotor 4B in the direction of travel F and the component of the lift force vector in the direction of height H can be different. Then, even if the rotational speeds of the forward motor 3A and the rear motor 3B are the same (i.e., the magnitude of the lift force obtained is the same), the rotary wing aircraft 15 can remain inclined with respect to the direction of travel F. In other words, it can fly in the direction of travel F while averaging the rotational speeds of the forward motor 3A and the rear motor 3B.

In the example shown in FIG. 12, the front motor 3A is provided to be rotatable around the pitch axis, but the technology is not limited to such examples. For example, other motors, such as the rear motor 3B and the side motor 3C, may also be provided to rotate around the pitch axis. Each motor 3 may also be rotatable around the roll or yaw axis in addition to the pitch axis.

The above is a description of several embodiments of rotary wing aircraft of the present disclosure. The above embodiments are only examples of the present disclosure, and the technology is not limited to the structure of the rotary wing aircraft disclosed in each embodiment. The configurations disclosed in the above multiple embodiments can be combined as appropriate. For example, in addition to controlling the center of gravity position, it is also possible to apply the above mentioned rotational mechanism around the pitch axis of the blade and motor, etc. to average the number of motor revolutions.

Figure 13:
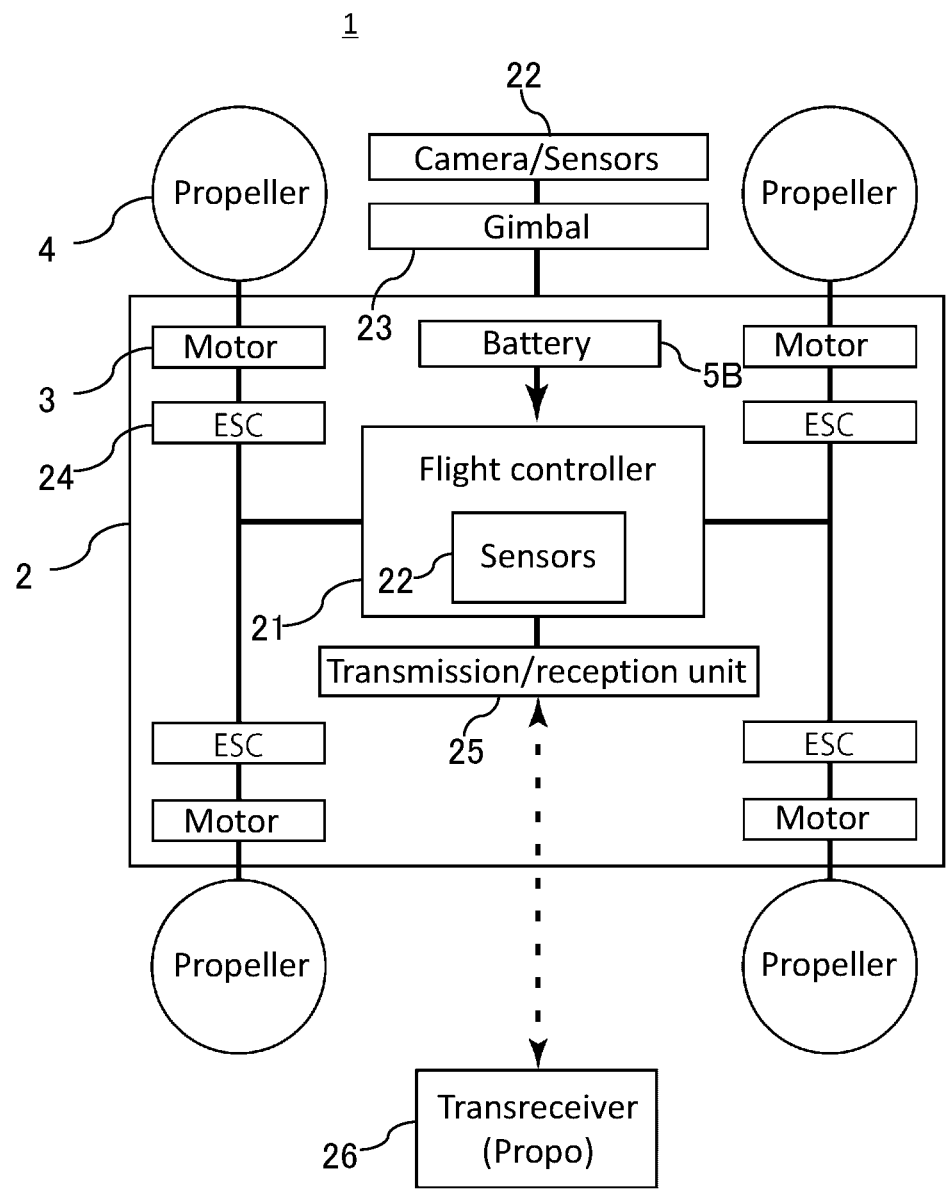
FIG. 13 is a block diagram showing an example of the functional configuration of a rotary wing aircraft for an embodiment of the present disclosure.

FIG. 13 is a block diagram showing an example of the functional configuration of a rotary wing aircraft according to one embodiment of the present disclosure. As shown in FIG. 13, the rotary wing aircraft 1 of one embodiment has, in the main body 2, a motor 3, a propeller (rotor) 4, a battery 5B, as well as a flight controller 21, a camera/sensors 22, a gimbal 23, an ESC 24, and a transmission/reception unit 25.

The flight controller 21 has one or more processors such as a programmable processor (e.g., central processing unit (CPU)).

The flight controller 21 has a memory, not shown, that is accessible. The memory stores logic, code, and/or program instructions that are executable by the flight controller to perform one or more steps.

The memory may include, for example, a separable medium such as an SD card or random access memory (RAM), etc. or an external storage device. Data acquired from the camera/sensors 22 may be directly transmitted to and stored in the memory. For example, still and moving image data captured by a camera or other device is recorded in the internal or external memory.

The flight controller 21 includes a control module configured to control the state of the flight vehicle. For example, the control module has six degrees of freedom (translational motion x, y, and z, and rotational motion $\theta_x$, $\theta_y$, and $\theta_z$) of the aircraft to adjust the spatial arrangement, speed, and/or acceleration of the aircraft's propulsion mechanism (e.g., motor 3, or the like) with ESC (Electric Speed Controller) through 24. The control module can control one or more of the states of the mounting part and sensors, or the like.

Flight controller 21 could communicate with the transmission/reception unit 25 configured to send and/or receive data from one or more external devices (e.g., terminals, displays, or other remote controllers). The transreceiver (Propo) 26 can use any suitable means of communication, such as wired or wireless communication.

For example, the transmission/reception unit 25 could use one or more of the followings: local area network (LAN), wide area network (WAN), infrared, wireless, WiFi, point-to-point (P2P) network, telecommunications network, and cloud communication.

The transmission/reception unit 25 can transmit and/or receive data acquired by the camera/sensors 22, processing results generated by the flight controller 21, predetermined control data, and one or more of the following can be transmitted and/or received: user commands from a terminal or remote controller.

The camera/sensors 22 in this embodiment may include inertial sensors (accelerometers, gyroscopes), GPS sensors, proximity sensors (e.g., lidar), or vision/image sensors (e.g., cameras).

Although the suitable embodiments of the present disclosure have been described in detail with reference to the accompanying drawings, the technical scope of the present disclosure is not limited to such examples. It is clear that a person having ordinary knowledge in the technical field of the present disclosure can conceive of various examples of changes or modifications within the scope of the technical ideas described in the claims, which are naturally understood to be within the technical scope of the present disclosure.

The effects described herein are only descriptive or exemplary and not limiting. In other words, the technology of the present disclosure may produce other effects that are obvious to those skilled in the art from the description herein, either together with or in place of the above effects.

The following configurations are also within the technical scope of this disclosure.

(Item 1)
A rotary wing aircraft comprising:
a main body; and
a plurality of motors for rotating each of rotors provided on the main body,
wherein the rotational speed of each of the plurality of motors is approximately the same when the main body is flying in the direction of travel inclined with respect to one direction of travel that is roughly parallel to a reference plane.

(Item 2)
The rotary wing aircraft according to Item 1,
wherein the location of the center of gravity of the rotary wing aircraft, when viewed from the side with respect to the direction of travel, is below a lift generating area that generates lift to the rotary wing aircraft, and
wherein the location of the center of gravity of the rotary wing aircraft is on the side in the direction of travel from the center position of the main body.

(Item 3)
The rotary wing aircraft according to Item 1,
wherein the location of the center of gravity of the rotary wing aircraft is, when viewed from the side with respect to the direction of travel, included in the lift generating area for generating lift to the rotary wing aircraft, and
wherein the location of the center of gravity of the rotary wing aircraft is located at the center position of the main body.

(Item 4)
The rotary wing aircraft according to Item 1,
wherein the location of the center of gravity of the rotary wing aircraft, when viewed from the side relative to the direction of travel, is above a lift generating area that generates lift to the rotary wing aircraft, and
wherein the location of the center of gravity of the rotary wing aircraft is on the opposite side of the direction of travel from the center position of the main body.

(Item 5)
The rotary wing aircraft as in any one of Items 1-4,
wherein the main body is formed by a frame provided parallel along at least the direction of travel.

(Item 6)
The rotary wing aircraft according to Item 5,
wherein a mounting part is further provided on the main body,
wherein the frame forms a central enclosed space, and
wherein the mounting part is provided in the enclosed space.

(Item 7)
The rotary wing aircraft according to Item 6,
wherein the plurality of motors includes a forward motor and a rear motor along the direction of travel, and
wherein the location of the center of gravity of the rotary wing aircraft is on the side of the direction of travel from the center location of the main body, when viewed from the side with respect to said direction of travel, and
wherein the distance between the forward motor and the reference position is longer than the distance between the rear motor and the reference position, when viewed from the side relative to the direction of travel, when the center position of the portion of the frame forming the enclosed space viewed from the side relative to the direction of travel is set as the reference position.

(Item 8)
The rotary wing aircraft as in any one of Items 1-7, further comprising:
an aerodynamic member attached to the main body and generating a lift force different from the rotor in flight.

(Item 9)
The rotary wing aircraft according to Item 8,
wherein the aerodynamic member includes a wing having an airfoil cross-section in a plane comprising the direction of travel and vertical direction.

(Item 10)
The rotary wing aircraft according to Item 9,
wherein the wing is provided rearwardly along the direction of travel from a central position of the main body, viewed from the side with respect to the direction of travel.

(Item 11)
The rotary wing aircraft according to Item 10,
wherein the wing is provided rearwardly along the direction of travel than each of the motors, viewed from the side with respect to the direction of travel.

(Item 12)
The rotary wing aircraft as in any one of Items 1 to 11,
wherein at least one of the plurality of motors is provided to be rotatable about at least a pitch axis.

(Item 13)
The rotary wing aircraft according to Item 12,
wherein the plurality of motors includes a forward motor and a rear motor along the direction of travel,
wherein the forward motor is provided to be rotatable about a pitch axis.

DESCRIPTION OF REFERENCE NUMERALS

1: rotary wing aircraft
2: main body
2A, 2B: frame
3A: forward motor
3B: rear motor
4A: front rotor
4B: rear rotor
5: mounting part
5A: enclosure
5B: battery

The invention claimed is:
1. A rotary wing aircraft comprising:
a main body;
a mounting part that includes an enclosure and a battery, the enclosure being located below the main body, the battery being located over the enclosure; and
a plurality of motors for rotating each of rotors provided on the main body, wherein each of the plurality of motors rotates and a rotational speed of each of the plurality of motors is approximately the same, when the main body is flying in a direction of travel while being inclined with respect to the direction of travel, wherein a location of a center of gravity of the rotary wing aircraft, when the main body is flying in the direction of travel while being inclined with respect to the direction of travel and the rotary wing aircraft is viewed from a side with respect to the direction of travel, is located within the enclosure, is below a lift generating area that generates lift to the rotary wing aircraft, and is on a forward side in the direction of travel from a center position of the main body.

2. The rotary wing aircraft according to claim 1, wherein the main body is formed by a frame provided parallel along at least the direction of travel.

3. The rotary wing aircraft according to claim 2, wherein a mounting part is further provided on the main body, wherein the frame forms a central enclosed space, and wherein the mounting part is provided in the enclosed space.

4. The rotary wing aircraft according to claim 3,
wherein the plurality of motors includes a forward motor and a rear motor along the direction of travel, and
wherein a distance between the forward motor and a reference position is longer than a distance between the rear motor and the reference position, when viewed from the side relative to the direction of travel, when a center position of a portion of the frame forming the enclosed space viewed from the side relative to the direction of travel is set as the reference position.

5. The rotary wing aircraft according to claim 1, further comprising:
an aerodynamic member attached to the main body and generating a lift force different from the rotor in flight.

6. The rotary wing aircraft according to claim 5, wherein the aerodynamic member includes a wing having an airfoil cross-section in a plane defined by the direction of travel and a vertical direction.

7. The rotary wing aircraft according to claim 6, wherein the wing is provided rearwardly along the direction of travel from a central position of the main body, viewed from the side with respect to the direction of travel.

8. The rotary wing aircraft according to claim 7,
wherein the plurality of motors includes a forward motor and a rear motor along the direction of travel, and
wherein the wing is provided rearwardly along the direction of travel than each of the forward and rear motors, viewed from the side with respect to the direction of travel.

9. The rotary wing aircraft according to claim 1, wherein at least one of the plurality of motors is provided to be rotatable about at least a pitch axis.

10. The rotary wing aircraft according to claim 9, wherein the plurality of motors includes a forward motor and a rear motor along the direction of travel, wherein the forward motor is provided to be rotatable about a pitch axis.

11. The rotary wing aircraft according to claim 1,
wherein the location of the center of gravity of the rotary wing aircraft, when viewed along a width direction of the rotary wing aircraft, is below the lift generating area, the width direction being perpendicular to a plane defined by the direction of travel and a height direction of the rotary wing aircraft.

12. The rotary wing aircraft according to claim 1, further comprising a wing being attached to the main body and having an airfoil cross-section in a plane defined by the direction of travel and a vertical direction,
wherein the plurality of motors includes a forward motor and a rear motor along the direction of travel, and
wherein the wing is provided rearwardly along the direction of travel than each of the forward and rear motors, viewed from the side with respect to the direction of travel.

13. A rotary wing aircraft comprising:
a main body;
a mounting part that includes an enclosure and a battery, the enclosure being located below the main body, the battery being located over the enclosure; and
a wing being attached to the main body and having an airfoil cross-section in a plane defined by the direction of travel and a vertical direction,
a plurality of motors for rotating each of rotors provided on the main body,
wherein each of the plurality of motors rotates and a rotational speed of each of the plurality of motors is approximately the same, when the main body is flying in a direction of travel while being inclined with respect to the direction of travel,
wherein a location of a center of gravity of the rotary wing aircraft, when the main body is flying in the direction of travel while being inclined with respect to the direction of travel and the rotary wing aircraft is viewed from a side with respect to the direction of travel, is included in a lift generating area for generating lift to the rotary wing aircraft and is located at a center position of the main body,
wherein the plurality of motors includes a forward motor and a rear motor along the direction of travel, and the wing is provided rearwardly along the direction of travel than each of the forward and rear motors, viewed from the side with respect to the direction of travel.

14. A rotary wing aircraft comprising:
a main body;
a plurality of motors for rotating each of rotors provided on the main body; and
a mounting part that includes an enclosure and a battery, the enclosure being located over the main body, the battery being located below the enclosure,
wherein each of the plurality of motors rotates and a rotational speed of each of the plurality of motors is approximately the same, when the main body is flying in a direction of travel while being inclined with respect to the direction of travel,
wherein a location of a center of gravity of the rotary wing aircraft, when the main body is flying in the direction of travel while being inclined with respect to the direction of travel and the rotary wing aircraft is viewed from a side relative to the direction of travel, is located within the enclosure, is above a lift generating area that generates lift to the rotary wing aircraft, and is on a rear side of the direction of travel from a center position of the main body.

15. The rotary wing aircraft according to claim 14, further comprising a wing being attached to the main body and having an airfoil cross-section in a plane defined by the direction of travel and a vertical direction,
wherein the plurality of motors includes a forward motor and a rear motor along the direction of travel, and
wherein the wing is provided rearwardly along the direction of travel than each of the forward and rear motors, viewed from the side with respect to the direction of travel.

* * * * *